US008843907B2

(12) United States Patent
Xu

(10) Patent No.: US 8,843,907 B2
(45) Date of Patent: Sep. 23, 2014

(54) COMPILER WITH ERROR HANDLING

(75) Inventor: Sichun Xu, Santa Clara, CA (US)

(73) Assignee: MyEzApp Inc., Santa Clara, CA (US)

( * ) Notice: Subject to any disclaimer, the term of this patent is extended or adjusted under 35 U.S.C. 154(b) by 358 days.

(21) Appl. No.: 13/331,996

(22) Filed: Dec. 20, 2011

(65) Prior Publication Data

US 2013/0055223 A1 Feb. 28, 2013

Related U.S. Application Data

(60) Provisional application No. 61/527,421, filed on Aug. 25, 2011.

(51) Int. Cl.
*G06F 9/45* (2006.01)

(52) U.S. Cl.
CPC . *G06F 8/427* (2013.01); *G06F 8/42* (2013.01)
USPC .......................................... 717/143; 717/140

(58) Field of Classification Search
None
See application file for complete search history.

(56) References Cited

U.S. PATENT DOCUMENTS

| | | | |
|---|---|---|---|
| 5,991,539 A * | 11/1999 | Williams ....................... | 717/143 |
| 6,182,281 B1 * | 1/2001 | Nackman et al. ............. | 717/116 |
| 6,286,130 B1 * | 9/2001 | Poulsen et al. ................ | 717/119 |
| 6,385,341 B1 * | 5/2002 | Lisitsa et al. .................. | 382/233 |
| 7,614,044 B2 * | 11/2009 | Bhansali et al. .............. | 717/145 |
| 7,861,072 B2 * | 12/2010 | Duffy et al. ................... | 712/244 |
| 8,146,085 B2 * | 3/2012 | Duffy et al. ................... | 718/100 |
| 8,271,768 B2 * | 9/2012 | Duffy et al. ................... | 712/244 |
| 2006/0149543 A1 * | 7/2006 | Lassalle ........................ | 704/235 |
| 2007/0214452 A1 * | 9/2007 | McCrady et al. ............. | 717/156 |
| 2008/0141228 A1 * | 6/2008 | Jeong ............................ | 717/140 |
| 2010/0088674 A1 * | 4/2010 | Della-Libera et al. ........ | 717/114 |
| 2010/0235280 A1 * | 9/2010 | Boyd et al. .................... | 705/44 |
| 2010/0325618 A1 * | 12/2010 | Song et al. .................... | 717/143 |
| 2010/0325619 A1 * | 12/2010 | Song et al. .................... | 717/143 |

* cited by examiner

*Primary Examiner* — Don Wong
*Assistant Examiner* — Daxin Wu
(74) *Attorney, Agent, or Firm* — Fountainhead Law Group, PC

(57) ABSTRACT

Disclosed is a programming language system that can produce executable program code from source code, even if the source code contains errors. In embodiments, the programming language system includes a fault tolerant compiler that can detect errors in the source code, but nonetheless produce valid compiler constructs representative of the errors in the source code. Accordingly, the compilation process can proceed despite errors in the source code and produce executable program code.

20 Claims, 10 Drawing Sheets

COMPILER WITH ERROR HANDLING

CROSS REFERENCE TO RELATED APPLICATIONS

The present disclosure claims priority to U.S. Provisional App. No. 61/527,421 filed Aug. 25, 2011, the content of which is incorporated herein by reference in its entirety for all purposes.

BACKGROUND

The present description generally relates to compilers for computer programming languages, and in particular to a compiler and compilation method that having error handling.

Unless otherwise indicated herein, the approaches described in this section are not prior art to the claims in this application and are not admitted to be prior art by inclusion in this section.

Developing software applications is becoming an increasingly expensive and complicated undertaking. The effort typically involves an investment in time and money. Consequently, only high value applications which have a chance to command a good price for licensing and support are being developed. Many ideas for applications that are useful, but which have less perceived value, are not being developed because of the cost of developing such applications.

For example, in an ideal world, every doctor should have a suite of applications to manage their patient, appointment, and billing functions. Every lawyer should have applications to manage their clients, documents, cases, and time. Every teacher should have applications to manage their courses materials, students, and tests. Every student should have applications to manage their classes, notes, schedules. In fact, everybody can have multiple applications to help manage various aspects of their life.

If the effort can be simplified so that the cost of developing software applications can be reduced to the point that non-programmer people can more easily create and customize their own applications, this could facilitate the development of more applications to serve very specific needs.

SUMMARY

In embodiments, a method for compiling source code includes receiving source code written in a computer programming language. The source code is compiled and executable program code is generated irrespective of whether the source code contains errors. In embodiments, errors in the source code (e.g., invalid programming constructs) may be detected during the compilation phase. Valid compiler constructs that represent the source code errors are generated and processed in the compilation phase. Executable program code may then be generated despite the source code having errors.

In embodiments, a method for compiling source code includes performing lexical analysis on the source code. Valid tokens are generated, which represent character strings in the source code that are defined by the grammar of the source code. Error token are generated, which represent character strings in the source code that are not defined by the grammar of the source code. A token list comprising both valid tokens and error tokens is produced. The token list is then processed during syntax analysis. Executable program code may then be produced despite the source code having errors in it.

In embodiments, a method for compiling source code written in a programming language includes performing syntax analysis on a token list produced by a lexical analyzer. The token list is processed by a series of sub-parsers, where each sub-parser is defined by a sub-grammar of a grammar of the programming language. Each sub-parser receives an input token list and produces an output token list in accordance with its defining sub-grammar. Each sub-parser will perform error handling to correct errors in its input token list, so that its output token list is correct with respect to its defining sub-grammar. Accordingly, each sub-parser receives the output token from the previous sub-parser that is correct relative to the previous sub-parser. The first sub-parser receives the token list produced by the lexical analyzer, the last sub-parser produces the final parse tree. Executable program code may then be produced despite the source code having errors in it.

The following detailed description and accompanying drawings provide a better understanding of the nature and advantages of the present invention.

DETAILED DESCRIPTION

Figure 1:
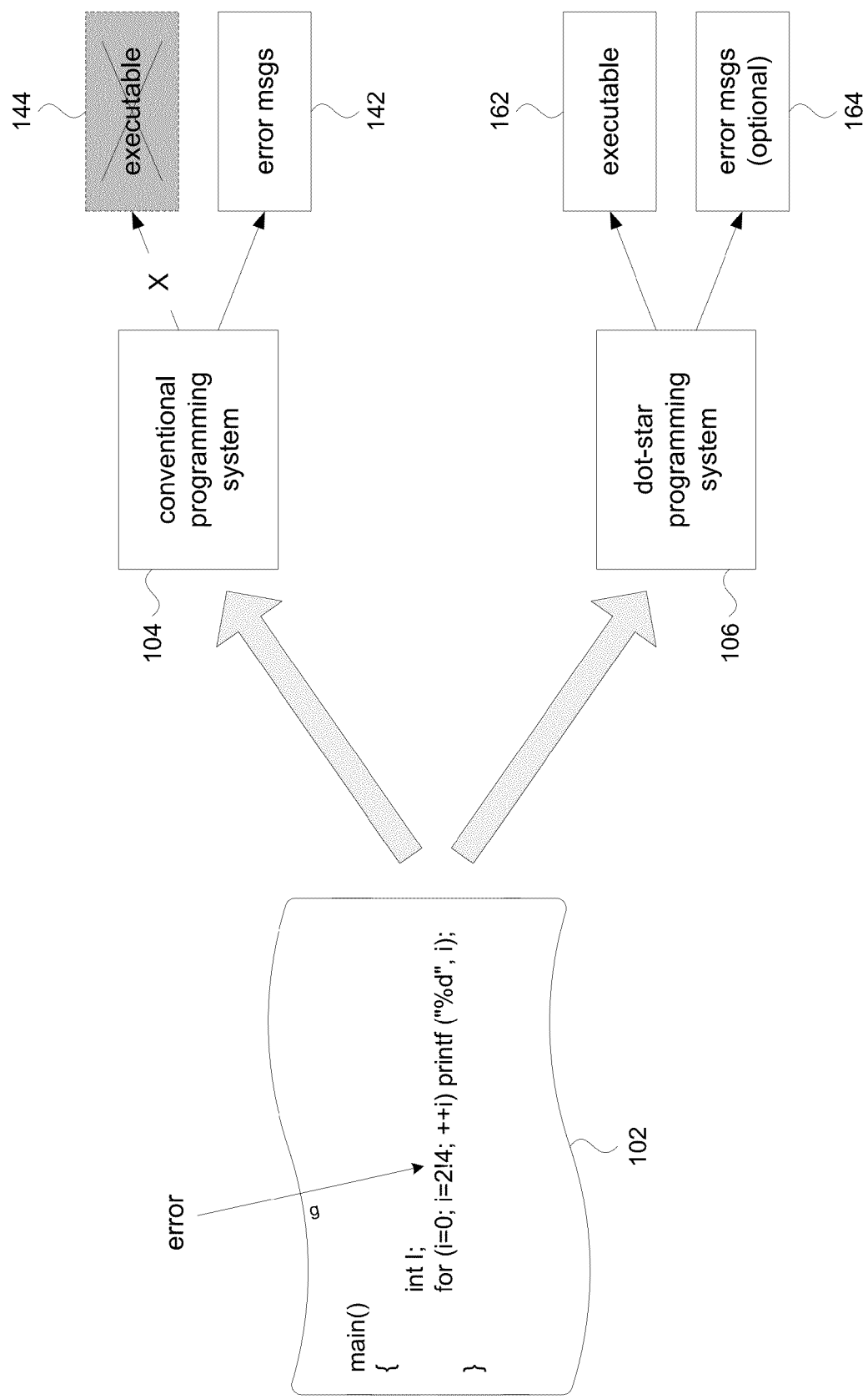
FIG. 1 illustrates conventional compiler processing as compared to compiler processing in a programming language system according to principles of the present invention.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Ability to Execute Arbitrary Input Program (Source Code)

A programming language system in accordance with principles of the present invention is disclosed herein. The programming language system of the present invention will be referred to herein by the name "dot-star". The name refers to the regular expression: ".*", where "." ("dot") matches any character and "*" ("star") matches zero or more instances of a regular expression (in this case "dot"). The regular expression ".*" therefore matches any input.

As the name suggest, the dot-star programming language system in accordance with the present invention can receive arbitrary input as source code and generate executable code, irrespective of the presence of errors in the source code. As will be explained in more detail, internal compilation errors detected in the source code during the compilation process can be handled so that the compilation process continues to completion and generates executable code that reflects the intent of the source code as close as possible.

Existing programming language systems accept only a small subset of all possible source code inputs. Usually, only well-structured, semantically consistent inputs are accepted; all other inputs are rejected with compilation errors. When compilation errors are detected, prior art programming language systems do not produce executable program code. By comparison, the dot-star programming language system takes a best effort approach to producing executable program code despite the presence of errors in the input source code. Source code comprises programming constructs (e.g., IF statements, FOR loops, expressions, and so on) which are converted during a process called compiling into internal data representations called compiler constructs (e.g., lexical token, parse trees, symbol tables, and so on).

As will be explained, when the dot-star programming language system identifies erroneous programming constructs in the source code, the system applies error recovery logic to generate a valid compiler construct so that the compilation may proceed without error to generate executable program code. Erroneous programming constructs may be errors in the text of the source code (e.g., an invalid number like "2!4") that would be detected during lexical analysis. Erroneous programming constructs may be syntactic errors (e.g., a closing parenthesis has been omitted) which may not be detected until well into the compilation process such a syntax analysis. In accordance with principles of the present invention, errors in the source code may be replaced with valid compiler constructs so that the compilation may proceed to completion with the production of executable program code despite the presence of such errors in the source code.

Referring to FIG. 1, suppose input source code 102 includes an error (e.g., "2!4" instead of 214). A conventional programming system 104 may generate one or more error messages 142 to flag the error, and may not generate executable code 144. By comparison, a programming system 106 in accordance with the present invention will generate executable code 164 despite the presence of the error in the source code 102. In some embodiments, the programming system 106 may generate error messages 162 to flag the error for debugging and troubleshooting.

Consider some simple examples to illustrate the dot-star programming language system. Suppose a beginner wants to write the famous "hello world" program. Using the dot-star programming language system, the user may simply enter the text "Hello World!". The dot-star programming language system may compile it, execute it, and output "Hello World!", exactly as what the user entered.

Consider another example. If a user wants to print "Hello World!" three times, the user may enter the following in a dot-star programming language system:

for var i=1 to 3
  Hello World!
next

The dot-star programming language system can support the foregoing loop structure. The output may look like:

Hello World!Hello World!Hello World!

As a final example, consider the following program:

var world="dear user"
for var i=1 to 3
  Hello World!
next

The output may look like:

Hello dear user!Hello dear user!Hello dear user!

The above example illustrates two points. First, the source input "world" can either be treated as a variable name and replaced by its value as shown in the third example, or "World" can be treated as a string literal and be directly printed out as in the first two examples. This happens because compiling the foregoing in accordance with the present invention, may first attempt to treat "World" as a variable name; e.g., during a lexical scanning phase. Later, for example, during a semantic analysis phase, the compilation process will not be able to resolve the name. For example, a conventional compiler may report a "symbol cannot be resolved" compilation error. In a dot-star programming language system, the error recovery logic may implement the following recovery rule "if a variable name cannot be resolved, just print out the name." This error recovery logic will convert "World" into a string literal and print it out.

The second point, is that additional programming constructs can be added into the dot star programming language. In addition to variable declarations and loops, the dot-star programming language can include in its grammar other common programming constructs such as logical and arithmetic expressions, branches, function declarations, class declarations, and so on. In fact, all of the modern programming language constructs can be added.

Figure 2:
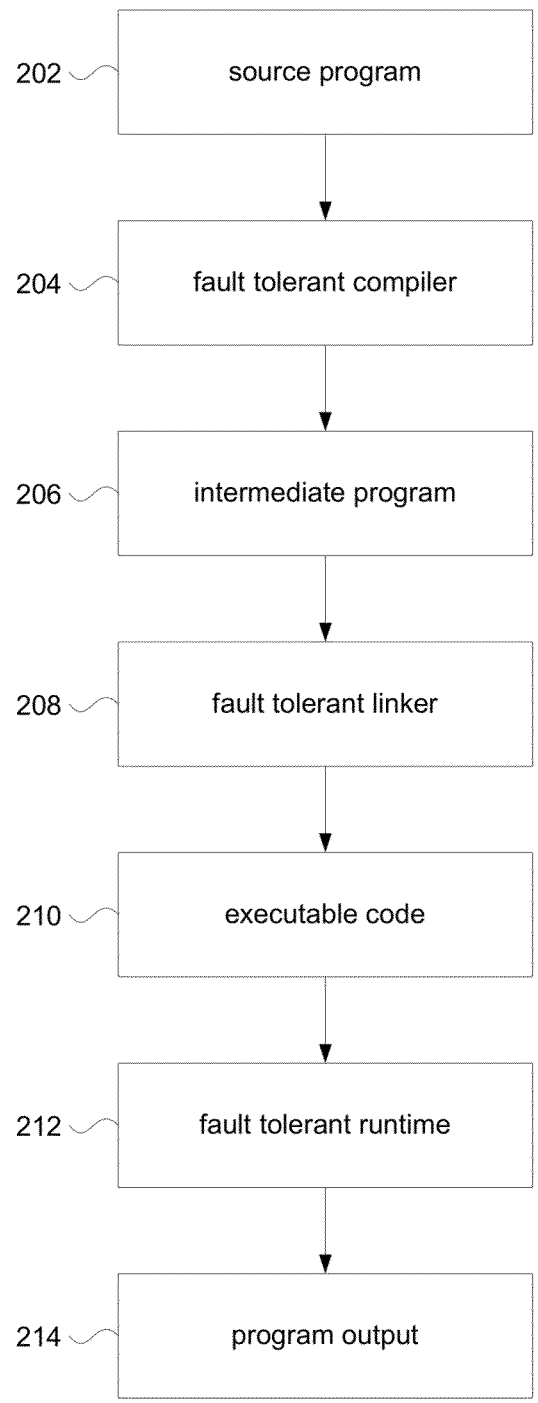
FIG. 2 illustrates a process flow of a programming language system of the present invention.

Referring to FIG. 2, an embodiment of the dot-star programming language system in accordance with principles of the present invention is illustrated. A conventional programming language system comprises: a compiler, a linker, and a runtime environment. The job of the compiler is to convert source program into a set of instructions that are ultimately executed by the runtime environment. The job of the linker is to combine multiple programs (e.g., large applications are generally contained in separate source files) together to form an executable application. The runtime environment then takes the executable application and executes it. The compiler, linker, and runtime environment may exist as a single tool. In some implementations, however, the compiler, linker, and runtime environment may be grouped in various ways; e.g., the compiler and linker may be one component and the runtime environment is a separate component.

FIG. 2 shows, in embodiments, a dot-star programming language system comprising a compiler, linker, and runtime environment that are fault tolerant. Source code 202 is received by a fault tolerant compiler 204. As will be explained in more detail below, the fault tolerant compiler 204 processes the source code 202 and generates compiler constructs for valid programming constructs detected in the source code and for invalid programming constructs detected in the source code. The fault tolerant compiler 204 produces an intermediate program 206. A fault tolerant linker 208 receives one or more intermediate programs and links the individual intermediate programs to produce executable code 210. If the source code 202 for an application is wholly contained in a single source file, then the fault tolerant linker 208 may not need to be invoked, and the intermediate program 206 produced by the fault tolerant compiler may be the executable code. The fault tolerant linker 208 is typically used to link together multiple intermediate program files (e.g., in a Unix-based environment, this may be multiple ".o" files). Continuing with FIG. 2, a fault tolerant runtime environment 212 causes execution of the executable code 210, which may include generating some program output 214.

A. Fault Tolerant Compiler 204, FIG. 2

A fault tolerant compiler refers to a compiler that is tolerant of errors in the input source code. A fault tolerant compiler in accordance with principles of the present invention may detect and recover from all possible compilation errors. The fault tolerant compiler may handle errors detected in the source code by mapping the errors into valid compiler constructs so that the compilation process can proceed to completion and generate executable code.

From an error recovery perspective, it is usually not difficult to develop specific error recovery logic for a given error condition. In a conventional compiler, the error recovery logic is typically straightforward. For example, approaches such as restarting a parser at the next synchronization point or eating up errors using an error production are sufficient. By comparison, a fault tolerant compiler in accordance with the present invention would continue parsing the errors and convert (map) the errors into valid compiler constructs so that executable code can still be generated. Based on experiments that I have performed, some design principles and implementation methodologies have been identified that have guided my design of a fault tolerant compiler in accordance with the present invention:

The error should be detected as early as possible.

The impact of an error should be contained as much as possible.

Keep all tokens until no further recovery is needed. The error recovery logic in accordance with the present invention therefore may require more information than normal compilation logic.

At every stage of the compilation process, provide a default error recovery rule that can be used if no other rules can handle the error.

Figure 3A:
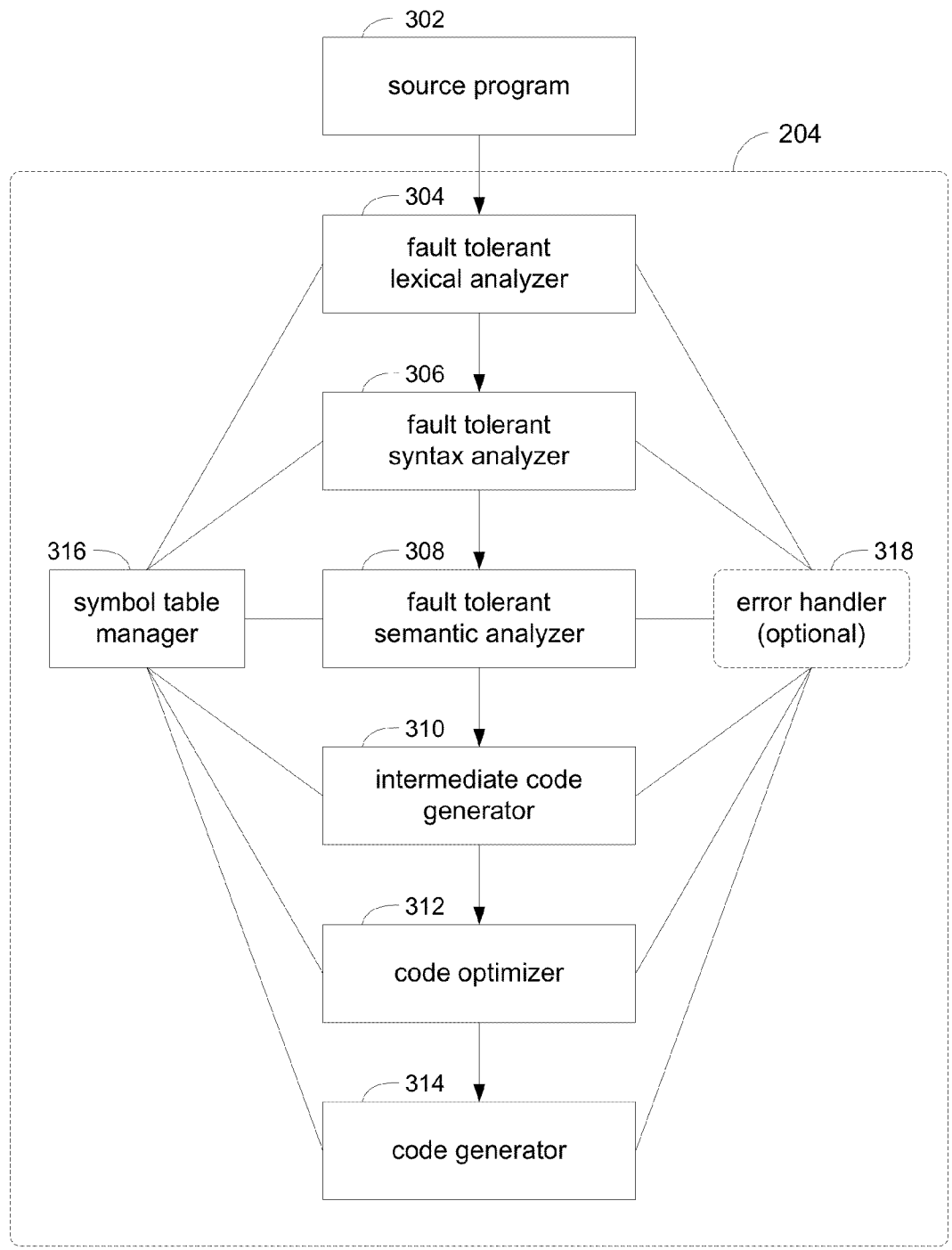
FIG. 3A is an illustrative process flow for a fault tolerant compiler in accordance with the present invention.

Referring to FIG. 3A, a block diagram of a fault tolerant compiler design in accordance with the principles of the present invention is illustrated. Source code 302 is received by a fault tolerant compiler (e.g., 204). A fault tolerant lexical analyzer 304 processes the source code 302 to produce a token list. This lexical analysis stage transforms a sequence of characters in the source code 302 to a sequence of compiler constructs referred to as lexical elements. These lexical elements include entities such as integers, floating point numbers, characters, strings of characters, identifiers, and so on.

The token list is passed on to a fault tolerant syntax analyzer 306 to perform parsing. This parsing stage generates another compiler construct known as a syntax tree (or parse tree) and verifies that the sequence of lexical elements is correct with respect to the grammar of the dot-star programming language. The syntax tree is then processed by a fault tolerant semantic analyzer 308. The semantic analysis stage traverses the syntax tree, checking another aspect of program correctness. The analysis consists principally of type inference, which if successful, produces the most general type of an expression or declaration. An intermediate code generator 310 may produce pseudo code that is representative of the final executable code. A code optimizer 312 may scan the pseudo code to make the code more compact or efficient. A code generator may 314 may then generate the actual executable code. A symbol table manager 316 may be accessed by the foregoing components of the compiler design.

Figure 3B:
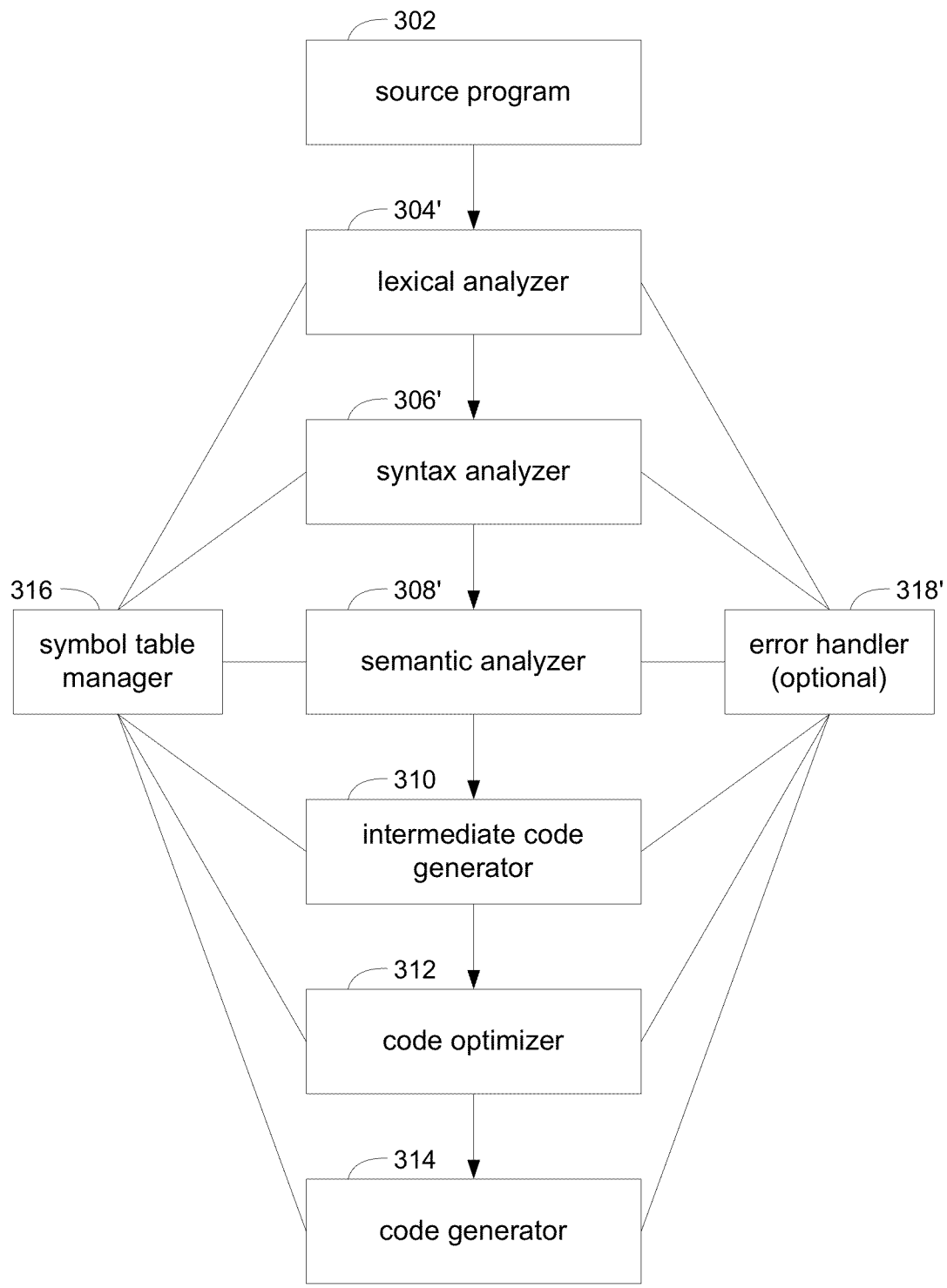
FIG. 3B is an illustrative process flow of a conventional compiler.

In accordance with the present invention, sophisticated error handling is provided in each of the fault tolerant lexical analyzer 304, the fault tolerant syntax analyzer 306, and the fault tolerant semantic analyzer 308. Referring for a moment to FIG. 3B, a conventional compiler design by comparison provides a global error handler 318' that the other modules report to, such as for example, conventional lexical analyzer 304', syntax analyzer 306' and semantic analyzer 308'. the global error handler 318' may simply record the errors and output them at the end of the compilation process. Returning to FIG. 3A, error reporting during compilation may nonetheless be useful for things like debugging and troubleshooting. Accordingly, the fault tolerant compiler 204 may include an error handler 318 for such purposes.

Some implementations may insert additional stages such as preprocessing, or combine multiple stages into one. When new stages are inserted, those stages may need to be fault tolerant as well. Usually, those stages are quite simple and recovery logic is also quite trivial. When stages are combined, the error recovery logic should also be combined. The last three stages 310-314 typically do not require error detection and recovery logic. However, it will be appreciated it is possible to add such error recovery logic if desired.

1. Fault Tolerant Lexical Analyzer 304, FIG. 3A

Generally, a lexical analyzer (scanner, tokenizer) scans the source code one character at a time to identify and group the characters (character strings) into lexical units (lexemes), such as keywords (e.g., IF, THEN, FOR, and so on) and integer literals (e.g., 123, 1024, etc.), according to the grammar of the programming language. The lexical analyzer identifies lexemes in the source code and builds a list of tokens for all the lexemes identified in the source code. A "token" is an internal representation of a lexeme that is used by the compilation process; a token is an example of a compiler construct. An output of a lexical analyzer is commonly referred to as a "token list". For example, the following input (e.g., from the source code):

$$sum=2+a*11$$

contains the lexemes "sum", "=", "2", "+", "a", "*", and "11". The following token list may be produced:

{ IDENTIFIER (sum), EQUAL, NUMBER (2), PLUS, IDENTIFIER (a), MULTIPLIER, NUMBER (11) }

It will be appreciated that there are many different ways to implement a lexical analyzer. Some implementation use a parser generator; while other implementations may be manually written. At the conceptual level, two things are common among conventional lexical analyzers. First, lexemes are typically recognized using some kind of state machine, such as Deterministic Finite Automaton (DFA) or a non-Deterministic Finite Automaton (NFA). The state machine may be generated by a parser generator, or manually coded using if/switch statement for example. Second, some tokens are filtered out, such as spaces between recognized lexemes.

In accordance with principles of the present invention, if the fault tolerant lexical analyzer 304 (FIG. 3A) scans a character string that it does not recognize, that character string is assigned to a new kind of token referred to as an ErrorToken. By comparison, a conventional lexical analyzer may simply note the occurrence of the error string, for example by recording it along with an error message to be listed or otherwise presented later on. The error string is not otherwise processed and discarded. For example, consider the following input:

$$sum=2+a*1!$$

where there an error in the constant "11" has been introduced (e.g., a typographical error by the programmer). Lexical analysis in accordance with the present invention may produce the following token list:

{ IDENTIFIER (sum), EQUAL, NUMBER (2), PLUS,
IDENTIFIER (a), MULTIPLIER, NUMBER (1),
ERROR_TOKEN(!) }.

By comparison, a conventional lexical analysis may produce the following token list:

{ IDENTIFIER (sum), EQUAL, NUMBER (2), PLUS,
IDENTIFIER (a), MULTIPLIER, NUMBER (1) }.

An error may be generated, noting that an unexpected "!" was encountered.

Figure 4:
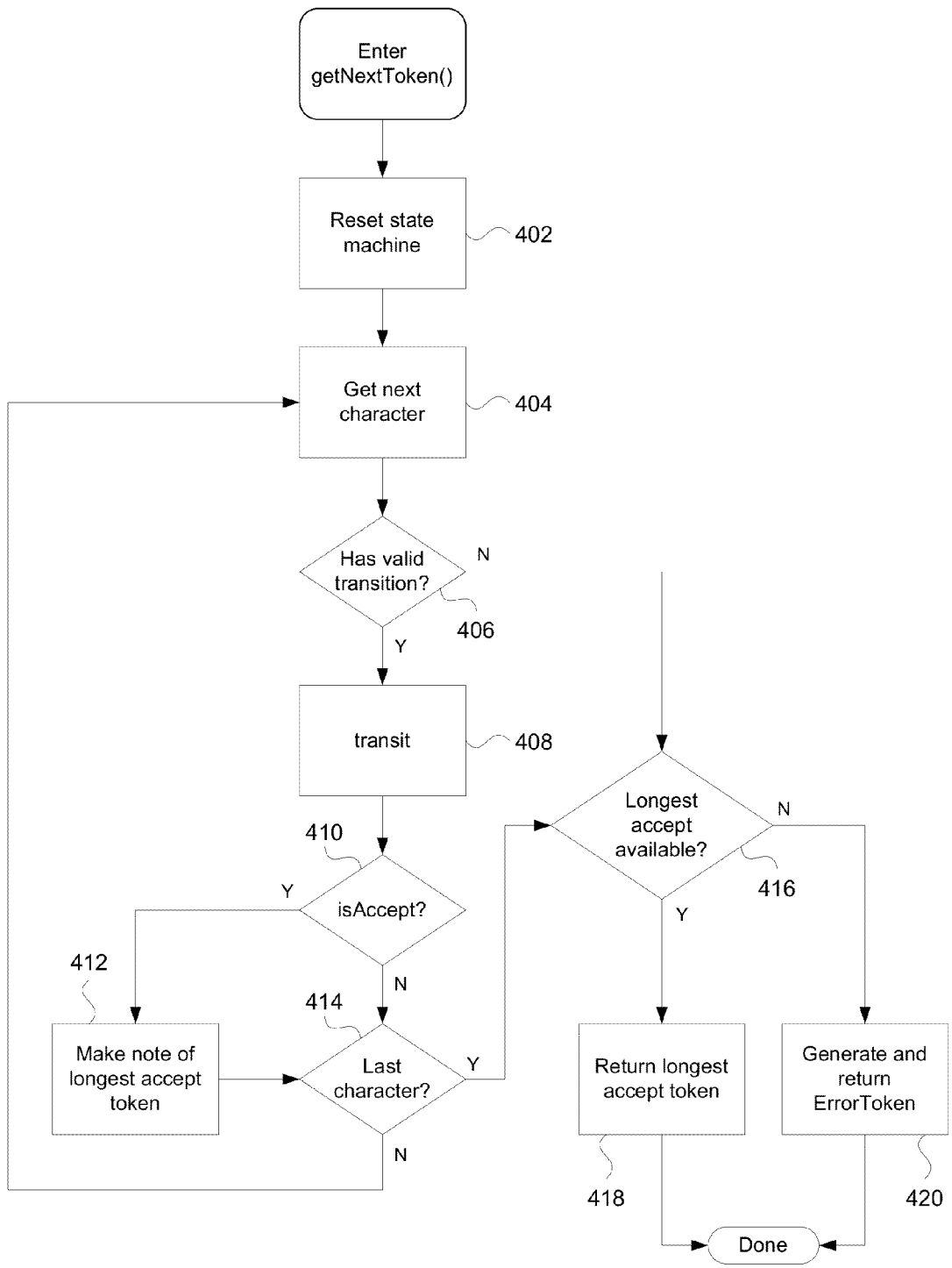
FIG. 4 illustrates a process flow for lexical analysis in accordance with principles of the present invention.

Referring to FIG. 4, an embodiment of processing by the fault tolerant lexical analyzer 304 (FIG. 3A) is shown. The figure shows the processing in a getNextToken( ) function call for identifying a lexeme from the source code with a state machine and returning a token that corresponds to the identified lexeme. In a step 402, the state machine is set to a reset state to get ready for inputting a character string, one character at a time. A character from the source code input is read in at a step 404. Based on the current state of the input character string, a state transition table is consulted to determine the next state. In a step 406 if a valid transition is found, then processing proceeds to a step 408, otherwise processing proceeds to a step 416 explained below. In step 408, the state machine transitions to a new current state.

In a step 410, a check is made whether the new current state is an ACCEPT state, meaning that the input character string may be a lexeme recognized by the grammar. If the new current state is an ACCEPT state (YES branch from step 410), then processing proceeds to a step 412, where a variable stores the input character string and an ACCEPT flag is set indicating that an acceptable token has been detected (i.e., the current input character string is recognized as being a lexeme defined in the grammar). For example, suppose "for" is a keyword in the grammar (e.g., a FOR loop keyword). If the input character string is "for", then the decision in step 410 would evaluate to YES because "for" is a lexeme in the grammar, and that input character string would be noted in step 412. Processing then continues to step 414.

If the decision in step 410 evaluates to NO, then the ACCEPT flag is cleared to indicate that the current state of the input character string does not represent an acceptable token (i.e., the current input character string is not recognized as being a lexeme defined in the grammar). For example, if the previous input character string was "for", then the ACCEPT flag would have been set as explained above. If the next character is "t", then the input character string now becomes "fort", which is presumably not a keyword in the grammar. Accordingly, step 410 evaluates to NO and the ACCEPT flag is cleared. Processing then continues to step 414.

If in step 414 the last character in the source code has been reached, then processing goes to step 416; otherwise, processing proceeds to step 404 to input the next character from the source code and processing continues as described above.

In step 416, a check is made whether an acceptable token has been noted in step 412; e.g., if the ACCEPT flag is set or not set. If set, then the process returns (in a step 418) a token that represents the input character string. For example, if the input character string is "for", then a token FOR may be returned in step 418. However, if in step 416 the input character string is not recognized by the grammar (e.g., the input character string is "fort"), then an erroneous character string in the source code has been detected, namely a character string that is not recognized by the grammar. In accordance with principles of the present invention, an ErrorToken may be returned in a step 420, as if the erroneous character string was a lexeme defined in the grammar. In some embodiments, the same token (e.g., ErrorToken) is used to represent all erroneous character strings. In other embodiments, each occurrence of an erroneous character string may be associated with an ordinal reference. For example, ErrorToken(1) may refer to the first occurrence of an unrecognized character string, ErrorToken(2) may refer to the second occurrence of an unrecognized character string, and so on.

Another aspect of the fault tolerant lexical analyzer 304 (FIG. 3A) is that all input characters are retained. For example, conventional lexical analyzers may recognize a string of white space characters (e.g., tabs, spaces, carriage returns, etc.). White space may be recognized by the grammar as white space, but is ignored. In accordance with the present invention, all input characters are tokenized and retained. Tokenizing and retaining all input characters in the source code provides the error recover logic information that may facilitate handling errors detected during compilation processing. Accordingly, step 418 may include returning some of the input characters obtained from step 404 back to the input stream so that it is not consumed and can be processed in the next invocation of the getNextToken( ) function call.

2. Fault Tolerant Syntax Analyzer 306, FIG. 3A

The token list generated by the fault tolerant lexical analyzer 304 feeds into the fault tolerant syntax analyzer 306. Generally, a syntax analyzer (parser) takes a token list and produces a parse tree (the parse tree is another example of a compiler construct, and is sometimes referred to as syntax tree) in accordance with the grammar of the programming language, in a process referred to as parsing. For example, the token list {Number(2), PLUS, Number(1)} may produce the following tree:

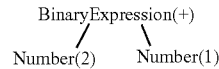

A typical programming language contains about one hundred grammar rules. Those grammar rules can generate thousands or tens of thousands of parsing states. Each parsing state has a set of expected "next" tokens. Any other tokens encountered are deemed unexpected. Such a situation is referred to as a "syntax error". When a parser reads the next token that falls into the expected "next" token set, it will trigger a state transition to the next parsing state. If the next token does not fall into the expected "next" token set, an error is detected and appropriated recovery logic must be triggered. Typically, in a conventional parser, an error message is reported (e.g., to the global error handler 318' in FIG. 3B) because the parser cannot make a decision on how to process the unexpected token. For example, suppose the parser inputs the following tokens: Number(2) and PLUS. The expected next token might be a number; e.g., the PLUS is an arithmetic operator that expects two numbers. If instead the parser inputs a MULTIPLY token, that would be unexpected since the grammar presumably does not have a definition for two consecutive arithmetic operators. A conventional parser is likely to generate and report an error message (e.g., "syntax error: unexpected *") and may simply cancel processing of the current sequence of tokens.

A syntax analyzer in accordance with principles of the present invention may consider every parsing state and provide error recovery logic for unexpected token. The error recovery logic may include re-parsing the input tokens and the unexpected to create a parse tree that conforms to the syntax of the grammar. For example, the token list, {Number (2), PLUS, MULTIPLY} may be reprocessed to produce the following parse tree for a PRINT statement:

PrintStmt
|
"2+*"

However, the total number of combinations can be very large. For example, suppose a grammar for a programming language defines 200 tokens. On average, half of them may fall into the expected next token set, and the other half in the unexpected set. Thus, about 100 unexpected tokens may need to be considered for each state. A programming language may have on the order of 5000 parsing states. Accordingly, about 500,000 (5000×100) different syntax errors may need to be handled.

The parsing of natural language requires a very large and thus inefficient parser because of the complexity of natural language grammars. A process of grammar partitioning may be used to partition a grammar into smaller sub-grammars to facilitate the parsing of large complex grammars. However, the challenge addressed by the syntax analyzer of the present invention is not the parsing, but rather the detection and handling of the large number of possible syntax errors. I discovered that if I partition the grammar into sub-grammars and parse the sub-grammars in stages, I can provide error recovery processing for syntax errors detected at each stage and realize an exponential reduction in the total number of syntax errors that need to be handled as compared the number of syntax errors in an un-partitioned grammar.

Figure 5A:
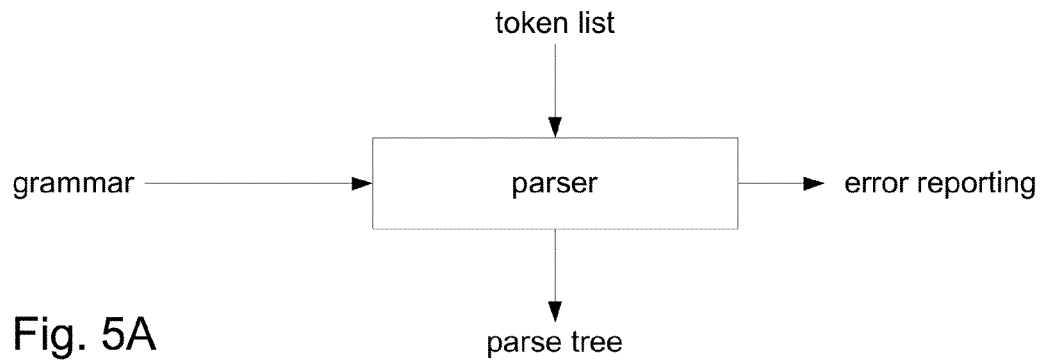
FIG. 5A depicts a conventional syntax analysis.

FIG. 5A illustrates a configuration of a conventional syntax analyzer (parser). The parser receives a token list and parses the list in accordance with the grammar rules (i.e., the syntax) of the grammar, and produces a parse tree. Syntax errors (i.e., sequences of tokens in the token list that are not defined by the grammar) are typically reported.

Figure 5B:
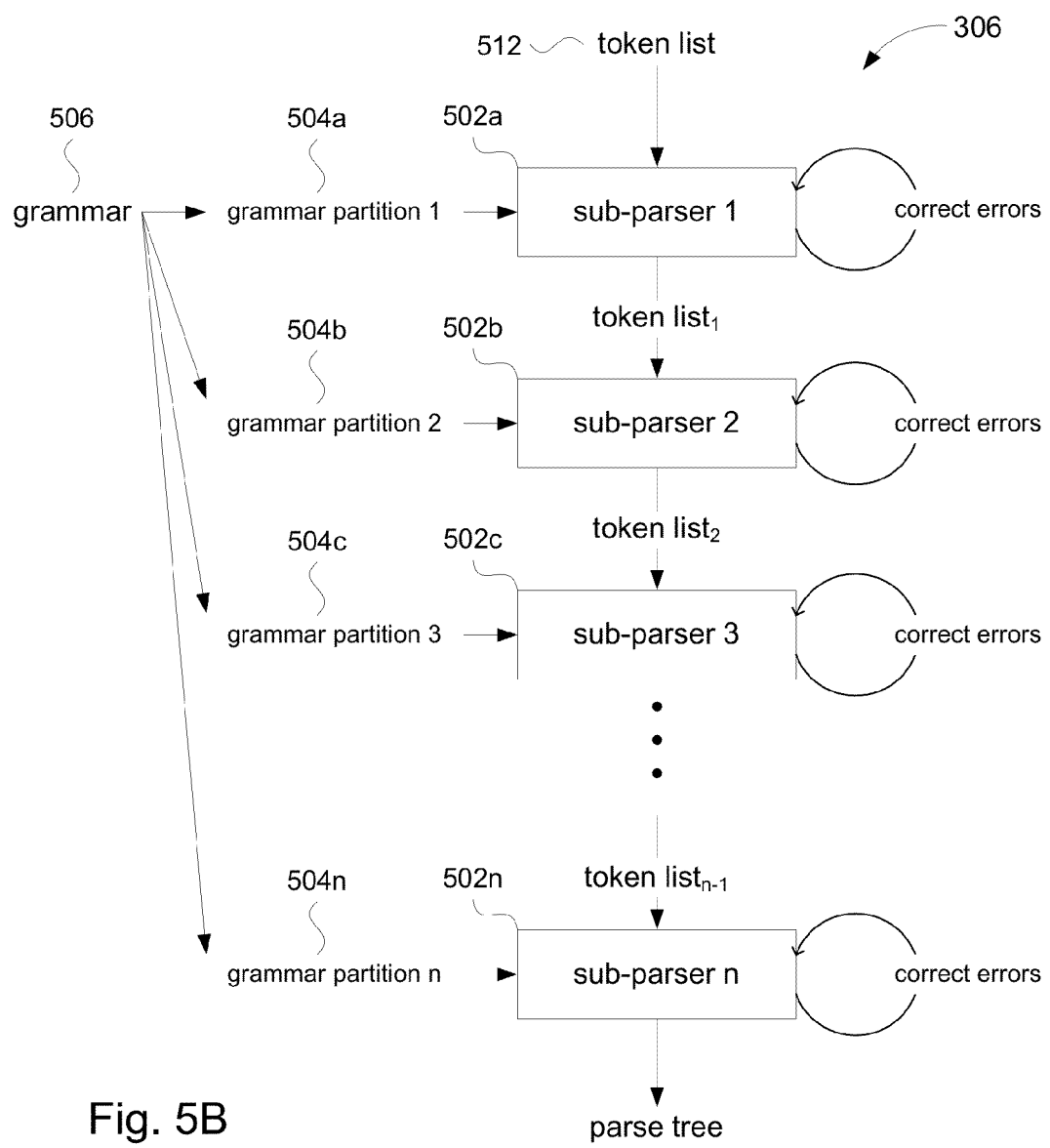
FIG. 5B illustrates syntax analysis in accordance with the present invention.

Referring to FIG. 5B, in some embodiments, the fault tolerant syntax analyzer 306 shown in FIG. 3A may comprise a plurality of sub-parsers 502a, 502b, 502c, . . . 502n. Each sub-parser 502a-502n parses respective sub-grammars 504a, 504b, 504c, . . . 504n which have been partitioned from a grammar 506. Each sub-parser 502a-502n parses an incoming token list in accordance with the grammar rules of its corresponding respective sub-grammar 504a-504n. And for each sub-parser, except the last sub-parser 502n, an output token list is produced that feeds into the subsequent sub-parser. The last sub-parser 502n produces the parse tree.

Thus, in FIG. 5B, a token list 512 may be produced by a lexical analyzer (e.g., 304, FIG. 3A). This token list 512 serves as the input token list for sub-parser 502a. In embodiments, the sub-parser 502a parses the input token list 512 in accordance with the sub-grammar 504a to produce an output token list (token list 1), which may represent a parse tree. The output token list serves as an input token list for the next sub-parser 502b. The sub-parser 502b parses token list 1 in accordance with sub-grammar 504b to produce an output toke list (token list 2), and so on until a parse tree is produced by the last sub-parser 502n.

In accordance with the present invention, each sub-parser (e.g., 502a) performs error correction of syntax errors detected while parsing its input token list (e.g., 512) according to its corresponding sub-grammar (e.g., 504a). In some embodiments, detected syntax errors may also be reported for debugging or troubleshooting. By correcting for every syntax error that may arise, the sub-parser produces an output token list (e.g., token list 1) that is syntactically correct with respect to the sub-grammar defining that sub-parser (e.g., sub-grammar 504a, sub-parser 502a). In this way, the next sub-parser (e.g., 502b) will receive a token list that is error free relative to the previous sub-parser (e.g., 502a).

Following is an example of grammar partitioning. Partitioning a grammar includes dividing all of the grammar productions (i.e., the grammar rules) into multiple groups or sub-grammars. Each grammar partition may then be translated into a corresponding sub-parser, using known parser generating tools, for example. Consider the following complete grammar as an example:

| Program | -> | StatementList |
| | | \| {Empty} |
| StatementList | -> | StatementList Statement |
| | | \| Statement |
| Statement | -> | VarDecl |
| | | \| AssignStmt |
| | | \| Expr |
| | | \| ForStmt |
| VarDecl | -> | 'Var' ID 'As' ID |
| AssignStmt | -> | ID '=' Expr |
| ForStmt | -> | 'For' 'Var' ID '=' Expr'To' Expr |
| | | StatementList |
| | | 'Next' |
| Expr | -> | CompareExpr |
| CompareExpr | -> | CompareExpr '>' AddExpr |
| | | \| CompareExpr '<' AddExpr |
| | | \| CompareExpr '==' AddExpr |
| | | \| CompareExpr '<>' AddExpr |
| | | \| AddExpr |
| AddExpr | -> | AddExpr '+' MultExpr |
| | | \| AddExpr '−' MultExpr |
| | | \| MultExpr |
| MultExpr | -> | MultExpr '*' Value |
| | | \| MultExpr '/' Value |
| | | \| Value |
| Value | -> | Literal |
| | | \| ID |
| | | \| '(' Expr ')' |

In accordance with an embodiment, the foregoing grammar may be partitioned into three groups as follows:

partition 1: only contains the top level grammar rules partition 2: contains all the complex statement level grammar rule partition 3: contains all the expression level grammar rules and simple statement grammar rules Accordingly, partition 1 may comprise the following sub-grammar:

| Program | -> | StatementList |
| | | \| {Empty} |
| StatementList | -> | StatementList Statement |
| | | \| Statement |

Partition 1 is very simple and very easy to code manually. The sub-grammar basically defines a program as consisting of one or more statements. The grammar productions define one terminal token called Statement and two non-terminal tokens called Program and StatementList. In some embodiments, error recovery may omitted at this level. The sub-parser for partition 2 can detect and perform error recovery so that it always return a valid statement. Following is an example of pseudo code for partition 1:

```
while input has more tokens to process
    processNextStatement( )
end
```

Partition 2 may comprise the following sub-grammar:

```
StatementList    ->    StatementList Statement
                       | Statement
Statement        ->    VarDecl
                       | AssignStmt
                       | Expr
                       | ForStmt
ForStmt          ->    ForStmtStart
                       StatementList
                       'Next'
```

Figure 6:
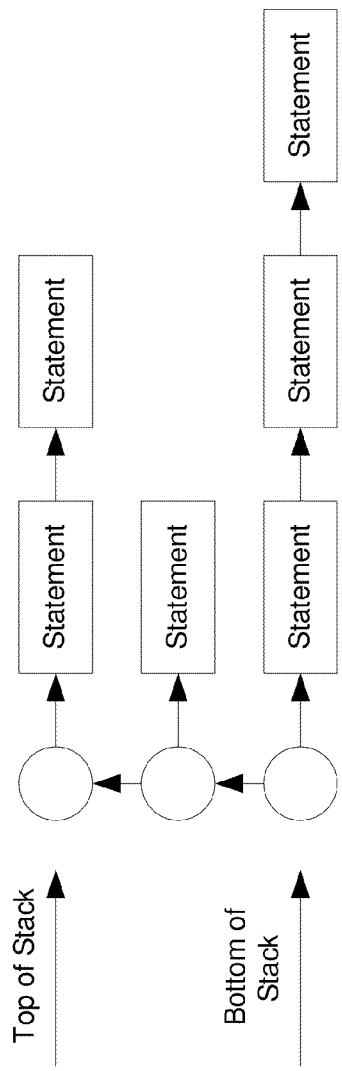
FIG. 6 shows an example of a stack structure for parsing statements in source code.

Partition 2 is more complex to code manually, but may still be small enough to be manageable. In a prototype implementation, I created a stack structure (FIG. 6) with each element in the stack representing a list of statements. An example of high level pseudo code for processing the sub-grammar of partition 2 is:

```
function processNextStatement( )
    if statement stack is not initialized, initialize it
    get next fragment -> nextFragment
    if nextFragment is 'VarDecl'
        peek statement stack -> listOfStatements
        add var declaration to the listOfStatements
    else if nextFragment is Expr
        peek statement stack -> listOfStatements
        add expression statement to the listOfStatements
    else if nextFragment is AssignStmt
        peek statement stack -> listOfStatements
        add assignment statement to the listOfStatements
    else if nextFragment is 'PrintStmt'
        peek statement stack -> listOfStatements
        add print statement to the listOfStatements
    else if nextFragment is 'ForStmtStart'
        create new for statement -> forStatement
        create new statement list -> listOfStatements
        add forStatement to listOfStatements
        push listOfStatements to the statement stack
    else if nextFragment is 'Next'
        if there is no matching for statement on the stack
            convert "Next" to an error token
        else
            do until hit for statement
                buildStatement( )
            end do
        end if
    end if
end function
function buildStatement( )
    pop statement stack -> listOfStatements
    get first element from listOfStatements -> firstStatement
    iterate through listOfStatements
        if not first statement
            add to the body of firstStatement
        end if
    end iteration
    peek statement stack -> listOfStatements
    add firstStatement to the listOfStatements
end function
```

Partition 3 may comprise the following sub-grammar:

```
Fragment         ->    Expr
                       | AssignStmt
                       | VarDecl
                       | ForStmtStart
```

```
Expr             ->    CompareExpr
CompareExpr      ->    CompareExpr '>' AddExpr
                       | CompareExpr '<' AddExpr
                       | CompareExpr '==' AddExpr
                       | CompareExpr '<>' AddExpr
                       | AddExpr
AddExpr          ->    AddExpr '+' MultExpr
                       | AddExpr '-' MultExpr
                       | MultExpr
MultExpr         ->    MultExpr '*' Value
                       | MultExpr '/' Value
                       | Value
Value            ->    Literal
                       | ID
                       | '(' Expr ')'
AssignStmt       ->    ID '=' Expr
VarDecl          ->    'Var' ID 'As' ID
ForStmtStart     ->    'For' 'Var' ID '=' Expr 'To' Expr
```

Partition 3 is the largest partition. I carefully divided the grammar, such that sub-grammar 3 only matches local structures; i.e., all the terminals and non-terminals of the sub-grammar are defined within the sub-grammar. Accordingly, error recovery can use an approach similar to the error recovery approach used for the fault tolerant lexical analyzer 304. A parser generator tool may be used to generate a suitable parser for partition 3. In a prototype implementation, the tool uses an LR parsing technique to generate a parser for this sub-grammar. Below is an example of pseudo code for running an LR sub-parser:

```
reset state machine to start state
while input has next token
    next token -> nextToken
    if nextToken is error or ignore token
        skip and continue
    end if
    if nextToken will trigger a shift action
        do shift
    else if nextToken will trigger a reduce action
        do reduce
    else if EOF is in the follow set
        reduce state machine based on EOF
        return matched fragment
    else
        convert nextToken into error fragment
        return error fragment
    end if
end while
```

The sub-parser returns "fragments" which represent strings of tokens from the input token list that are defined by the sub-grammar. In accordance with the present invention, strings of tokens which are not defined by the sub-grammar are also represented by a fragment, namely an "error fragment".

Figure 7:
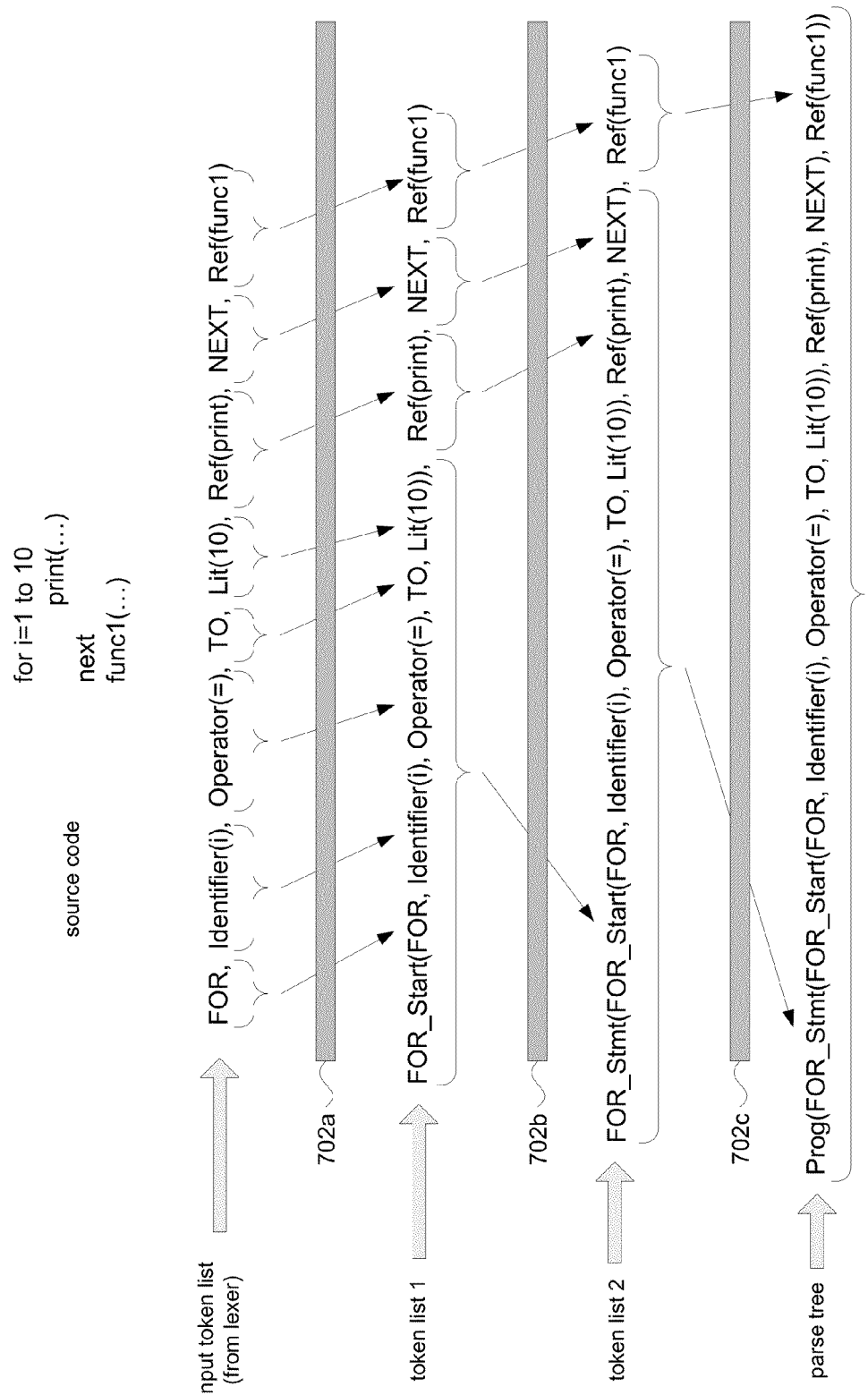
FIG. 7 illustrates processing by the sub-parsers shown in FIG. 5B.

Referring to FIG. 7, an example of parsing with sub-parsers 702a, 702b, 702c is illustrated for a fragment of source code that includes a FOR loop and function call. A lexical analyzer (lexer) may generate the token list shown in the figure, comprising tokens for each lexical element identified in the source code fragment; e.g., FOR, Identifier(i), and so on. The token list may serve as an input token list into the first sub-parser 702a. The first sub-parser 702a may be a parser for the lowest level sub-grammar (e.g., partition 3 described above). The resulting output token list 1 may comprise tokens representing the grammar productions comprising the sub-grammar represented by the sub-parser 702a. Thus, for example, a FOR_Start production token, two Ref production tokens, and a NEXT production token may be identified by sub-parser

702*a*. The output token list 1 from sub-parser 702*a* then becomes an input token list for sub-parser 702*b*, where the corresponding sub-grammar may recognize the following production tokens: FOR_Stmt and a Ref. Note the first Ref (the "print" statement) is subsumed within the FOR_Stmt production token. The resulting output token list 2 then feeds into sub-parser 702*c*, where a parse tree is output.

Consider the print statement example above: "print 2+*". In this example, once we encounter "*", we will recognize "print 2" as a valid statement, and thus return a production token that represents "print 2". The tokens which represent "+" and "*" are returned to the input token list, and parsing is restarted. On subsequent parsing cycles, the "+" and "*" tokens will be deemed as unexpected tokens, and the error recovery action will be to generate extra print statements with "+" and "*" as the text of the print statements. In the end, you will have {print(2), print(+), print(*)} as the output statement list. Thus, in accordance with principles of the present invention, errors in the source code may be handled so that they are incorporated as part of the executable program code as if they were valid elements.

As can be seen, the fault tolerant syntax analyzer 306 can detect syntax errors within a sub-parser, and correct the errors so that its output token list is valid for that sub-parser, and a valid token list is input feeds into a subsequent sub-parser. By doing so, syntax errors are eliminated on the fly and syntax analysis may go to completion and output a valid parse tree despite there being syntax errors in the source code. If the syntax errors are recorded, then they can be reported to the user (e.g., programmer) for debugging purposes.

3. Fault Tolerant Semantic Analyzer 308, FIG. 3A

The function of a semantic analyzer is to take the resulting parse tree (an abstract syntax tree) and analyze the validity of a program. In this stage, there can be many error conditions. However, many of the error conditions are manually manageable. Existing compilers typically perform error detection in this phase. In accordance with the present invention, for each detected error, there is corresponding recovery logic to eliminate the error.

A large class of errors during semantic analysis phase is type related. For example, an identifier X may not have a declared data type (e.g., the programmer omitted a statement like "int X" from their source code). Another example is the occurrence of two different data types in an expression (e.g., X=A+Y, where X and Y are FLOATs and A is a CHAR). Such errors can be naturally fixed using type inference and type coercion. For example, when a type for an identifier is missing, we can infer its type based on how the identifier is used. Consider the following source code:

var a=3
    var b="Hello"
    var c=a+b
    c

Neither "a" nor "b" has a declared type. Using type inference, we can assign "a" the type "number", and assign "b" the type "string" simply because it is the data type of the initialization expression. Type inference is an existing technology that has been around for some time.

The expression "a+b" must also be considered, because it adds two values having different data types. There are existing technologies that address this problem, and it is referred to as "type coercion". Type coercion will convert the data type of one object into another type so that the evaluation can proceed. In the above example, we may employ a type coercion rule that says, for the "+" operator, if one operand has type "number" and another operand has type "string", let's convert the "number" object into a "string" object and use string version of "+", which is to concatenate the two operands. Applying type inference and type coercion together, the above example may produce the following output, without reporting any error:

3Hello

Another example of error recovery in the semantic analyzer is symbol name resolution.

When a symbol name cannot be resolved, an error occurs. One error recovery strategy for this type of error is to convert the symbol name into a direct output. For example, the following source code:

var b=3
    1+a+(2+b)

will produce as output:

1+a+5

Since the symbol "a" cannot be resolved, the input "1+a" is treated as a character string. However, "(2+b)" can be evaluated, and so "5" is output.

B. Fault Tolerant Linker 208, FIG. 2

Linking is the process of combining multiple program objects together to form a single executable application; e.g., in a Unix environment, program objects are stored in files having a ".o" extension in the file name. The most common error is external name resolution. When one program object refers to a name that does not exist in any other program objects, the name cannot be resolved. The same error recovery logic used by the fault tolerant semantic analyzer 308 can be used during linking phase as well. To make this work, the syntax tree and symbol table are retained at linking time, because it is needed by the recovery logic.

Another example of errors that can happen during linking time is multiple entry points. One simple strategy to recovery from such errors is to sort the entry points based on program names, and then pick the first to execute. Other recovery strategies are also possible, in general, it is quite easy to handle.

C. Fault Tolerant Runtime Environment 210, FIG. 2

A static programming language (e.g., C Programming Language) requires compilation and possibly linking. The result is a file containing executable program code. The runtime for static programming language executables typically comprises the operating system loading the executable and causing the program code to execute. For a static programming language, the error recovery mechanisms of the present invention are incorporated in the disclosed fault tolerant compiler 204 and fault tolerant linker 208. There should be no need for error recovery in the runtime environment.

A dynamic programming language (e.g., Basic, LISP) are interpreted languages. The runtime environment usually includes a compiler (and possibly a linker) in order to provide on the fly compilation and execution as the user enters their code. For example, a user at a computer terminal may have the following interaction with a Basic interpreter:

| | |
|---|---|
| >10 | a=100 |
| >20 | b=20 |
| >30 | print a/b |
| >40 | print a+b |
| >50 | run |
| << | 5 120 |
| > | |

The user interacts with a runtime environment to input their code. The runtime environment may invoke a compiler component when the user enters the "run" in order to compile the code at lines 10-30. The runtime environment may then execute the compiled code. In accordance with the present invention, the compiler component may incorporate the error recovery logic of the fault tolerant compiler 204. Moreover, additional error recovery logic may be incorporated in the runtime environment itself. For example, in an embodiment, every statement may be enclosed in a try-catch block. Thus, the statements "a=100", "b=20", "print a/b", and "print a+b" may become:

try {statement_1} catch (error) print {error message}
    try {statement_2} catch (error) print {error message}
    try {statement_3} catch (error) print {error message}
    try {statement_4} catch (error) print {error message} where statement_1 is a production token that represents "a=100", statement_2 is a production token that represents "b=20",
    statement_3 is a production token that represents "print a/b", and
    statement_4 is a production token that represents "print a+b".

Suppose the statement "b=20" instead is "b=0". Though statement_1 and statement_2 would be executed, the try-catch block for statement_3 will throw an exception, namely "divide by zero exception", which will be caught and print out a suitable error message. However, statement_4 would be executed. Thus, for example, the runtime environment might look like:

```
>10        a=100
>20        b=0
>30        print a/b
>40        print a+b
>50        run
<<         [[error: div by zero]] 100
>
```

Examples of Error Recovery Processing

There are number of ways for error recovery in accordance with principles of the present invention. Generally, error recovery involves detecting invalid programming constructs in the source code and producing valid compiler constructs so that executable program code may be generated despite errors in the source code. Sometimes, there is a straightforward way to convert an error into specific valid compiler construct. For example, when a type declaration is missing or two different types of objects are added in one expression, we can automatically perform type casting or type coercion to enforce proper data types. Sometimes, erroneous input can be simply ignored. For example, an unreachable statement, such as statements after a function return can be ignored. Sometimes, errors can be converted into direct output; i.e., printed. The first two error recovery methods are quite straightforward. The third one, direct output, entails certain considerations.

When a program contains a piece of text which cannot be processed as a valid programming construct, we can use direct output processing as a method to handle the error. In embodiments, direct output processing includes outputting not only the name, but also the formatting tokens and error tokens in between. Consider the "hello world" program. When a user enters the "Hello World!" program, not only do we want to output the token "hello" and "world", we can do three additional things. First, we can retain the white space between tokens. Second, we can retain the ending "!" character, which is an ErrorToken. Third, we can preserve all the cases of the tokens.

In an embodiment, the direct output error recovery includes dividing the formatting tokens into two groups. The first group comprises formatting tokens inside a statement, excluding the body of a complex statement. The second group comprises the formatting tokens between statements. Formatting tokens inside a statement may be handled based on the type of the statement. Formatting tokens between statements may be uniformly treated based on an algorithm.

A. Formatting Inside a Statement

Formatting tokens inside a statement may be handled based on the type of the statement. In an embodiment, when a portion of a statement cannot be evaluates, we will keep all the formatting tokens. Formatting tokens may otherwise be ignored for valid statements. For example, suppose we have the expression:

var b=3
    1+a+(2+b)

The following output may be produced:

1+a+5

The spaces on both sides of the "+" are ignored, because the expression "(2+b)" can be evaluated. By comparison, the spaces outside of the parenthetical expression are preserved, because the token "a" cannot be evaluated, and converted to direct output.

B. Formatting Between Statements

Figure 8:
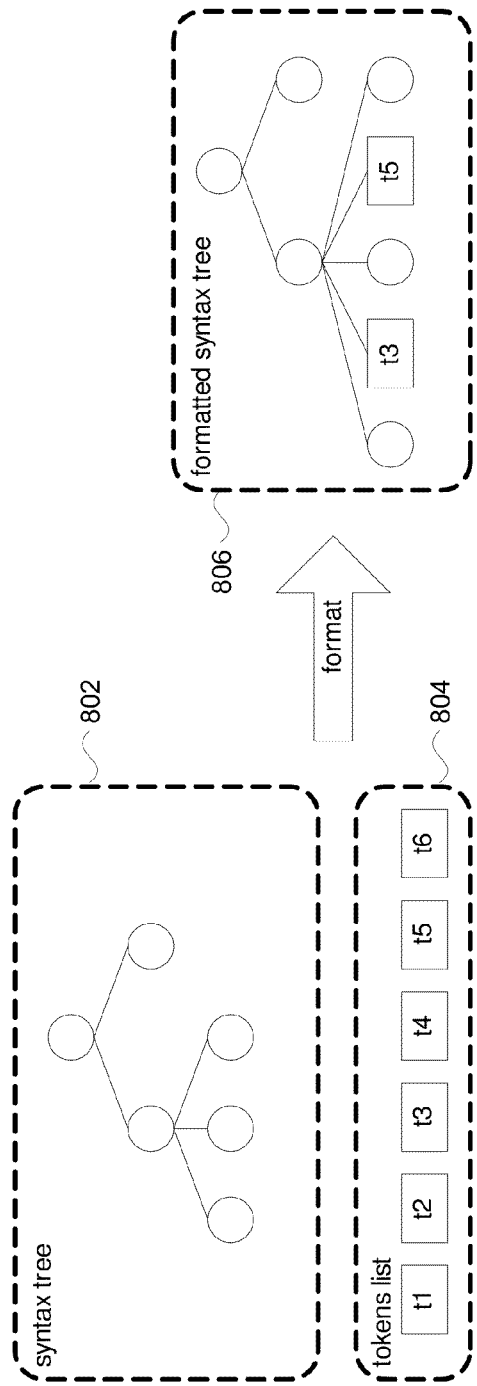
FIG. 8 shows an example of format processing in accordance with the present invention.

In some embodiments, handling formatting between statements may include an new formatting phase after all the error recovery logic is performed by the compiler. During the compilation process, the formatting tokens are not processed; they are simply carried over until the end of the compilation process. After the semantic analyzer phase and before code generation, a formatting phase may be performed to traverse the abstract syntax tree. Formatting may then be applied as needed. An illustrative example is shown in FIG. 8. The figure depicts a syntax tree 802 (parse tree) that may the result of syntax analysis, and a token list 804 that may be the result of lexical analysis. In accordance with the present invention, the token list 804 may include formatting tokens. A formatting phase may be performed to incorporate formatting tokens (e.g., t3, t5) from the token list 804 into the syntax tree 802. The figure shows an example of a "formatted" syntax tree 806 which shows incorporation of the formatting tokens t3, t5.

We can divide statements into two types: output statement and non-output statement. Output statements include expressions, error tokens, unresolved references, elements, and so on. Other statements are non-output statements. In embodiments, we may use a special char '|' to override the default formatting behavior.

In an embodiment, to preserve formatting tokens between statements, we may consider two consecutive statements in accordance with the following:

When two statements are both output statements, then preserve all formatting tokens between them.
    When two statements are both non-output statements, then ignore all formatting tokens between them.
    When the first statement is an output statement and the second statement is a non-output statement, then keep all formatting tokens between the first statement and the last non formatting token, or a first separator after the last non formatting token, or, if there is no non formatting token and no separator, then do not keep any formatting tokens.
    When the first fragment is a non-output statement and the second fragment is an output statement, then skip formatting tokens until we hit the first non-formatting token or the last separator before the first non-formatting token. If there is no non-formatting token and no separator, then do not keep any formatting tokens.
    Treat both the beginning of program and end of program as an output statement.

Figure 9:
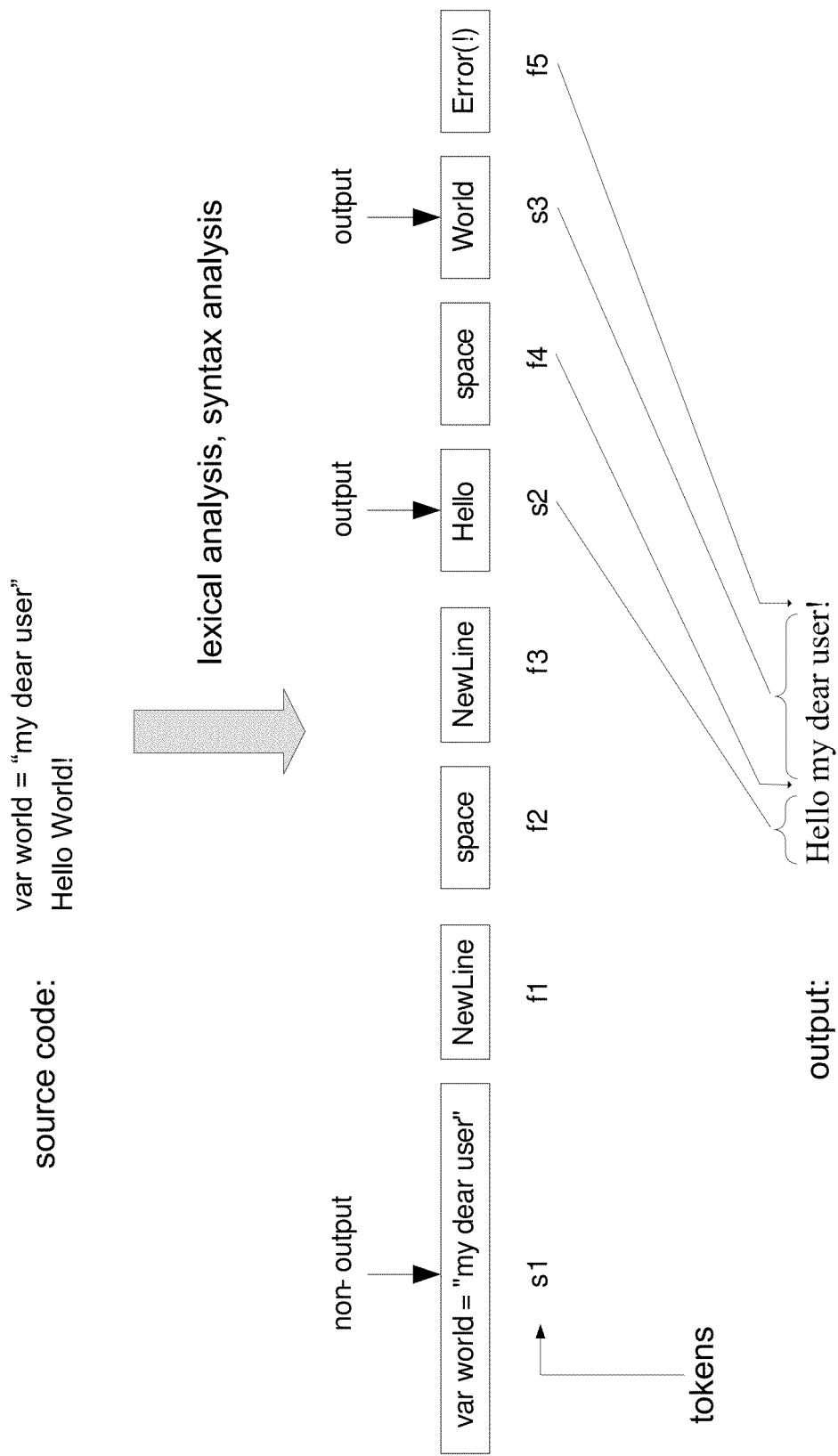
FIG. 9 shows an aspect of format processing in accordance with the present invention.

Referring to FIG. 9, consider the following source code example:
    var world="my dear user"
    Hello World!
The source code may be split into the tokens shown in FIG. 9. Statement token s1 represents a non-output statement and statement token s2 represents an output statement. Based on the algorithm above, formatting tokens f1, f2, and f3 are not preserved. Statement token s2 is an output statement and statement token s3 is an output statement. Based on the algorithm above, formatting token f3 will be preserved. Statement token s3 is an output statement and we can treat EOF as an output statement as well. Based on the algorithm above, formatting token f5 is also preserved. The final output may look like:
    Hello my dear user!
In the case of complex statements such as IF statement, FOR statement, function body, and so on, we can traverse the abstract syntax tree (e.g., 804) and apply the above algorithm recursively for the body part of each statement.

Figure 10:
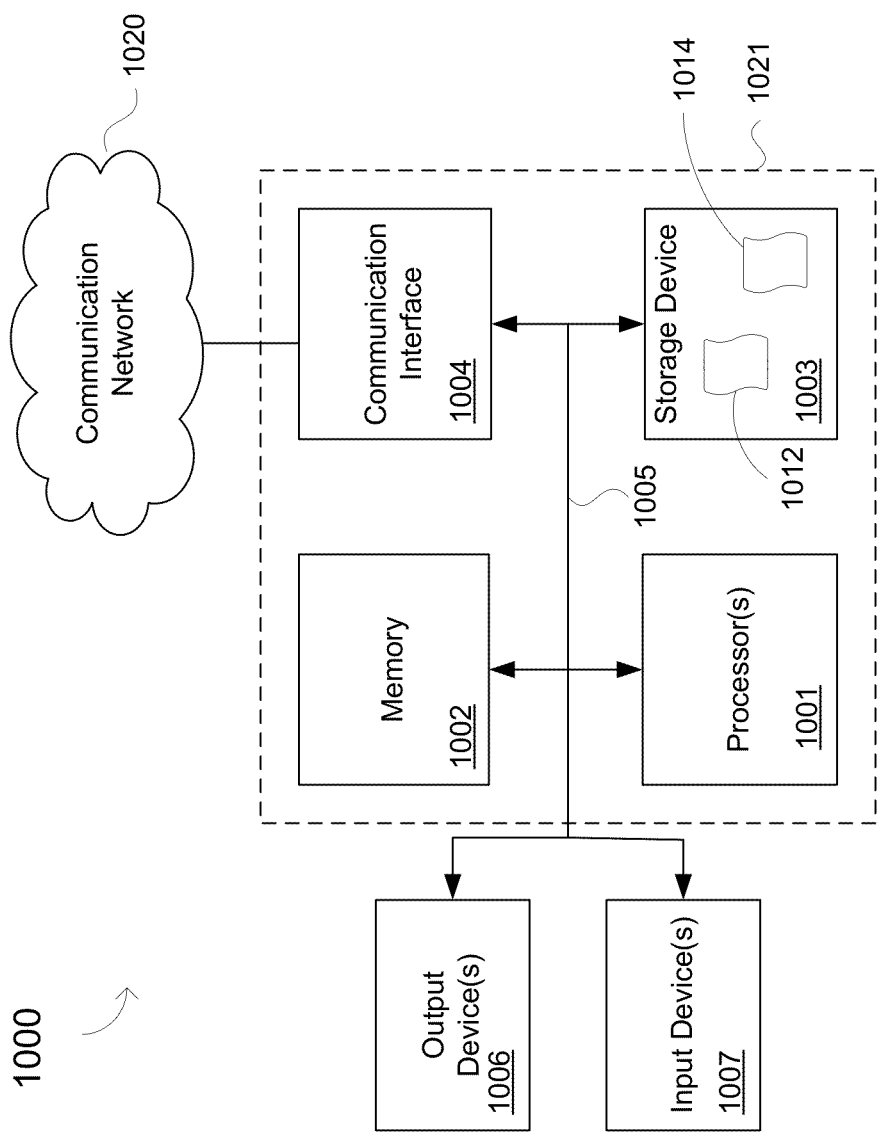
FIG. 10 illustrates a computer system in accordance with the present invention.

FIG. 10 is a block diagram of a system 1000 according to some embodiments. The system 1000 includes a computer 1021 that may be connected to a communication network 1020, such as the Internet. The computer 1021 may be configured as a general purpose computing apparatus and may execute program code that implements the dot-star programming language system 106 described herein. The computer 1021 may implement on or more of the fault tolerant compiler 204, fault tolerant linker 208, and fault tolerant runtime environment 212.

The computer 1021 includes, among its components, a processor component 1001 (comprising one or more processing units) operatively coupled to a communication interface 1004, a data storage device 1003, one or more input devices 1007, one or more output devices 1006, and a memory 1002. The communication interface 1004 may facilitate communication on the communication network.

Input device(s) 1007 may include, for example, a keyboard, a keypad, a mouse or other pointing device, a microphone, knob or a switch, an Infra-Red (IR) port, a docking station, a touch screen, and so on. Input device(s) 1007 may be used, for example, to enter information into the computer. Output device(s) 1006 may include, for example, a display (e.g., a display screen), a speaker, a printer, and so on. Additional elements (not shown) may be including according to some embodiments.

The data storage device 1003 may comprise any appropriate persistent storage device, including combinations of magnetic storage devices (e.g., magnetic tape, hard disk drives and flash memory), optical storage devices, Read Only Memory (ROM) devices, etc., while memory 1002 may comprise Random Access Memory (RAM).

The data storage device 1003 may store program code 1012 which may be executed by the processor component 1001 to cause the computer to perform any one or more of the processes and methods described herein; for example, the fault tolerant compiler 204, fault tolerant linker 208, and fault tolerant runtime environment 212. Embodiments are not limited to execution of these processes by a single apparatus.

The data storage device 1003 may store data structures 1014 such as object instance data, runtime objects, and any other data described herein. The data storage device 1003 may also store data and other program code for providing additional functionality and/or which are necessary for operation thereof, such as device drivers, operating system files, etc.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

Source Code Examples and Their Outputs

Following is a table of individual and independent examples of source code program fragments and their respective outputs, generated in accordance with principles of the present invention. Each row represents a different example. A comment field provides a brief explanation of how each example may be processed in accordance with the present invention:

TABLE

| Source | Output | Comment |
| --- | --- | --- |
| hello | hello | Unresolved identifier falls back to print statement |
| hello world | hello world | Multiple unresolved identifier falls back to print statements |
| hello     world | hello     world | Space preserved between multiple unresolved identifiers |
| \n\|Hello World! | Hello World! | Character "\" used to control formatting |
| "String with \" inside" | String with " inside | Using "\" to escape special characters |

TABLE-continued

| Source | Output | Comment |
|---|---|---|
| public class HelloWorld {<br>    public static void main(String[ ] args) {<br>System.out.println("Hello, World");<br>    }<br>} | public class HelloWorld {<br>    public static void main(String[ ] args) {<br>System.out.println("Hello, World");<br>    }<br>} | Fallback a piece of Java program. |
| <html> | <html> | Unresolved markup gets printed out. |
| ok. | ok. | Unresolved identifiers and error token "." being printed out. |
| <div></div><br><div><br><div/> | <div></div><br><div><br><div/> | Print out multiple tags, with the closing tag format being preserved. |
| hello world! | hello world! | Hello world program. |
| by default, we will do it right! | by default, we will do it right! | Random sentences get printed out after applying error recovery logic. |
| what's up? | what's up? | |
| //this is comment<br>hello world! | hello world! | Single line comment |
| // comment line 1<br>var world = Steve<br>// comment line 2<br>//comment line 3<br>Hello World!<br>// comment line 4 | Hello Steve! | Multiple single line comment |
| Hello World!\i\Hello World! | Hello World!<br>Hello World! | Special formatting control syntax allowing controlling the output format precisely. |
| "(" \n \\ \\n | (<br>\ \n | Testing several escape characters |
| <table><br>  for var i = 1 to 2<br>    <tr><br>      <td>Hello World!</td><br>    </tr><br>  next<br></table><br></body><br></html> | <table><tr><br>  <td>Hello World!</td><br></tr><tr><br>  <td>Hello World!</td><br></tr></table><br></body><br></html> | Mixing loop statement with markups. |
| var a = hello<br>a | hello | Simple test for variable declaration |
| var world = Steve<br>Hello World! | Hello Steve! | More complex test for variable declaration |
| var name = "steve"<br>name<br>\name | steve<br>name | Testing special escape character "\" |
| 1+1 | 2 | Simple add expression |
| do it or not. | do it or not. | Fallback of unmatched keyword "not" |
| var i as int =1<br>i | 1 | Variable declaration for integer type. |
| a–b | a–b | Unresolved expression gets printed out |
| var b=1<br>a+b | a+1 | Partial fallback of an expression. Name "b" is resolved to number 1 whereas unresolved name "a" is retained in the output. |
| var a = 1<br>b + a + c | b + 1 + c | More complex partial fallback of expression. |
| var a = 1<br>var c = 1<br>b + (a + c) | b + 2 | Partial expression fallback with "(" and ")" |
| var a = 1<br>var b = "steve"<br>b + (a + c) | steve + (1 + c) | One more test for partial expression fallback. |
| Hello|World! | HelloWorld! | Test of pipe operator |
| var world = Steve<br>Hello|World! | HelloSteve! | Test of pipe operator combined with variable replacement |
| var good = bad<br>this is good. that is ok. | this is bad. that is ok. | More complex test contains variable replacement and variable fallback. |
| var that = bad<br>this is good. that is ok. | this is good. bad is ok. | More complex test on variable replacement and variable fallback. |

TABLE-continued

| Source | Output | Comment |
|---|---|---|
| var a = 1<br>fib(a) | fib(1) | Test of function reference fallback |
| var a = 1<br>arr[a] | arr[1] | Test of array fallback |
| func fib(n as int)<br>  if n <= 2 then return 1 end<br>  return fib(n-1) + fib(n-2)<br>end<br>fib(a) | fib(a) | Test of function call fallback |
| func sayhello(n as int, name as string)<br>  for var i = 1 to n<br>    Hello name!<br>  next<br>end<br>sayhello(1, Steve) | Hello Steve! | Test of function call |
| \fib(n) | fib(n) | Test of "\" escape for function call |
| true or not right | true or not right | Test of Boolean value combined with reference fallback |
| var a as byte = "a"<br>a = a >> 1<br>a | 48 | Test the ">>" operator |
| not true | false | Test the "not" operator |
| -a | -a | Test the "-" operator with name fallback |
| var a = 1<br>(-(a+1)) | -2 | Test the no error case. |
| for var i = 1 to 3<br>  i<br>next | 123 | Test fall loop |
| \for var i = 1 to 10<br>  Steve<br>next | forto 10<br>  Steve<br>next | Test fall loop being escaped by "\" |
| for var i = 1 to 2<br>  | Hello World!<br>Next | Hello World! Hello World! | Testing for loop with pipe operator |
| for var i = 1 to 3<br>  Hello<br>next<br>. | HelloHelloHello. | Test for loop containing name fallback |
| var sum = 0<br>for var i = 1 to 3<br>  sum = sum + i<br>  sum<br>next | 136 | Test for loop without fallback |
| var a = 1<br>if a>0 then<br>  "a>0"<br>elseif a>1 then<br>  "a>1"<br>else<br>  "else"<br>end | a>0 | Test if statement |
| if true then<br>  Hello World! !<br>end | Hello World! ! | Test if statement with fallback |
| var a = "aa"<br>if a == "aa" then<br>  great<br>end | great | Test if statement with Boolean expression as condition |
| var i = 2<br>DoWhile i > 0<br>  hello world<br>  i = i - 1<br>End | hello worldhello world | Test do while loop |
| func fib(n as int) as int<br>  if n == 0 then return 1 end<br>  if n == 1 then return 1 end<br>  return fib(n-1) + fib(n-2)<br>end<br>for var i = 0 to 10 | 1123581321345589 | Test recursive function. |

TABLE-continued

| Source | Output | Comment |
|---|---|---|
| fib(i)<br>next | | |
| func myhello( )<br>  Hello World!<br>end<br>myhello( ) | Hello World! | Test function call |
| func mytag(name as string, count as int)<br>  for var i = 1 to count<br><td>i</td><td>name</td><br>  next<br>end<br><mytag name="steve" count=1/> | <td>1</td><td>steve</td> | Test function based tag |
| class person<br>  var _firstname as string<br>  var _lastname as string<br>  func person(fname as string, lname as string)<br>    _firstname = fname<br>    _lastname = lname<br>  end<br>  func toString( )<br>    return _lastname + ", " + _firstname<br>  end<br>end<br>func sayhello(per as person, count as int)<br>  for var i = 1 to count<br>    <div>Hello per!</div><br>  next<br>end<br><sayhello per=(new person("steve", "xu")) count=2/> | <div>Hello xu, steve!</div><div>Hello xu, steve!</div> | Test class based tag |
| var world = Steve<br>func sayhello(count as int)<br>  for var i = 1 to count<br>    if i > 1 then<br>      \n<br>    end<br>    | Hello World!<br>  next<br>end<br><sayhello count=2/> | Hello Steve!<br>Hello Steve! | Test function based tag with parameters |
| func fib(n as int)<br>  if n <= 2 then return 1 end<br>  return fib(n−1) + fib(n−2)<br>end<br>var i = 10<br>fib("10") = fib(i) | fib(10) = 55 | |
| func myfunc( ) as int<br>  "output for myfunc ="<br>  return 1<br>end<br>myfunc( ) | output for myfunc = 1 | Test function based tag with return value |
| use /lang/object<br>class person<br>  var firstname as string<br>  var lastname as string<br>end<br>var p = new person( )<br>p.firstname = "steve"<br>p.lastname = "xu"<br>"firstname : " | firstname :   steve<br>lastname :   xu | Test simple class |

TABLE-continued

| Source | Output | Comment |
|---|---|---|
| p.firstname<br>"lastname : "<br>p.lastname | | |
| class person<br>  var __firstname as string<br>  var __lastname as string<br>  func person(fname as string, lname as string)<br>    __firstname = fname<br>    __lastname = lname<br>  end<br>  func toString( )<br>    return __lastName + ", " + __firstname<br>  end<br>end<br>var p = new person("steve", "xu")<br>p | xu, steve | Test simple class with toString method. |
| class base<br>  func display( )<br>    Base Hello World!<br>  end<br>end<br>class child extends base<br>  func display( )<br>    Child Hello World!<br>  end<br>end<br>var v as base<br>v = new child( )<br>v.display( ) | Child Hello World! | Test class inheritance. |
| class base<br>  func display( )<br>    Base Hello World!<br>  end<br>end<br>class child extends base<br>  func display( )<br>    super.display( )<br>    |Child Hello World!<br>  end<br>end<br>var v as base<br>v = new child( )<br>v.display( ) | Base Hello World!Child Hello World! | Test class inheritance with super call |
| class nc<br>  var __txt as string<br>  native func nc( )<br>"<br>    v__stxt = \"Hello\";<br>"<br>end<br>var c = new nc( )<br>c.__txt | Hello | Test class inheritance with native function. |
| func mytag( )<br>  <hello/><br>end<br><mytag n=v/> | <hello/> | Test function based tag |
| func mytag( )<br>  <hello><br>    <world><br>    </world><br>  </hello><br>end<br><mytag n=v/> | <hello><br>  <world><br>  </world><br></hello> | Test function contains nested tags. |
| func mytag( )<br>  <hello><br>    <mytag1/><br>  </hello><br>end<br>func mytag1( )<br>  <world/> | <hello><br>  <world/><br></hello> | Test calling function tag inside another function. |

TABLE-continued

| Source | Output | Comment |
|---|---|---|
| end<br><mytag n=v/><br>func mytag( )<br>    content<br>end<br><mytag><br>  <hello/><br></mytag> | <hello/> | Test tag content reference |
| func a( )<br>   <table/><br>end<br><a> | <table/> | Test function containing regular tag. |
| func a(name as string)<br>  hello name!<br>end<br><a name = "steve"/> | hello steve! | Test function tag with parameter in double quote. |
| func mytag(name as string)<br>  name<br>end<br><mytag name='steve'/> | steve | Test function tag with parameter in single quote. |
| <meta http-equiv="X-UA-Compatible" content="IE=8"> | <meta http-equiv="X-UA-Compatible" content="IE=8"> | Test common html pattern |
| <mytag prop=value/> | <mytag prop="value"/> | Test tag format. |
| <myelement value = #ffffff/> | <myelement value="#ffffff"/> | Test tag with color value |
| func fib(n as int)<br>  if n <= 2 then return 1 end<br>  return fib(n−1) + fib(n−2)<br>end<br><fib n=10/> | 55 | Test recursive function in tag format. |
| use /base/comp as c<br><c:boxit><br>  <c:sayhello/><br></c:boxit> | <div style="border:1"><br>  Hello World!<br></div> | Test calling function tag in another script. |
| class mycomp extends component<br>  func process( )<br>    Hello World!<br>  end<br>end<br><mycomp/> | Hello World! | Test component tag. |
| class mycomp extends component<br>  var __name as string<br>  func mycomp(name as string)<br>    __name = name<br>  end<br>  func process( )<br>    for var i = 1 to 2<br>      Hello __name!<br>    next<br>  end<br>end<br><mycomp name="Steve"/> | Hello Steve!Hello Steve! | Test component tag inheritance. |
| use /web/wcomponent<br>class mytag extends wcomponent<br>  var testname as string<br>  func process( )<br>    "my name is" testname<br>  end<br>end<br><mytag><br>  testname = "Steve"<br></mytag> | my name is Steve | Test component tag with reference inside component body. |
| use /web/wcomponent<br>class mytag extends wcomponent<br>  public var testname as string<br>  public var testint as | my name is Stevetest int is 1test bool is true | Test component tag for different field types. |

TABLE-continued

| Source | Output | Comment |
|---|---|---|
| int<br>   public var testbool<br>as bool<br>   func process( )<br>      \|"my name is"<br>testname<br>      \|"test int is"<br>testint<br>      \|"test bool is"<br>testbool<br>   end<br>end<br><mytag><br><testname>Steve</testname><br>   <testint>1</testint><br><testbool>true</testbool><br></mytag> | | |
| var a =<br><element><br>   Hello!<br></element><br>a | <element><br>   Hello!<br></element> | Test element assigning to variable with type inference. |
| var a as node.element<br>a = <element><br>   Hello!<br></element><br>a | <element><br>   Hello!<br></element> | Test element assigning to variable with type specified. |
| func returnElement( )<br>   return <element> Hello! </element><br>end<br>var a as node.element<br>a = returnElement( )<br>a | <element> Hello! </element> | Test returning element structure from function. |
| use /web/wcomponent<br>class test extends wcomponent<br>   public var label as string = "my label"<br>   func process( )<br>      <div>label</div><br>   end<br>end<br><test label="replace label"/> | <div>replace label</div> | Test setting class component using tag attribute. |
| // inside the value, if we use complex placeholder, it will be executed, rendered into string<br>class story<br>   public var title as string<br>end<br><init:story><br><title>mytitle</title><br></init:story><br>var s = new story( )<br>init_story(s)<br>s.title | mytitle | Test dynamic tag configuration. |
| var s as string<br>if s == null then<br>   hello<br>end | hello | Test null |
| func getFirstChar(s as string) as string<br>   if s == null or s.length( ) == 0 then<br>      return " "<br>   end<br>   var i = 1<br>   var c = s.charAt(i)<br>   return c<br>end<br>getFirstChar("abcd") | a | Test built-in character function. |
| character.digit("a", 10) | −1 | Test digit function |
| func name( ) | hello | Test return type inference |

TABLE-continued

| Source | Output | Comment |
|---|---|---|
| return "hello"<br>end<br>name( ) | | |
| func arrLen(arr as object[ ]) as int<br>  return arr.length<br>end<br>arrLen(new object[10]) | 11 | Test array length function |
| var result = new int[10][100]<br>result.length | 101 | Test multiple dimension array |
| var a = cast("aa", string)<br>a | aa | Test "cast" operator |
| use /util/map<br>var m = map.newHashMap( )<br>m.put("key", "value")<br>m.get("key") | value | Test built-in map |
| use /util/map<br>var m = map.newHashMap( )<br>m.put("key", "value")<br>m.get("key")<br>var it = m.keySet( ).iterator( )<br>DoWhile it.hasNext( )<br>  var k = it.next( )<br>  m.get(k)<br>End | valuevalue | Test build-in hashmap |
| use /util/list<br>var l = list.newArrayList( )<br>l.add("first")<br>l.add("second")<br>l.get(1)<br>l.get(2)<br>l.size( ) | true<br>true<br>first<br>second<br>2 | Test built-in list. |
| by default formatting preserved | by default formatting preserved | Test formatting preservation |
| @simple<br>func a(n as string)<br>  var name = n<br>  for var i = 1 to 1<br>    hello n!<br>  next<br>end<br><a n="steve"><br><a n="ashely"> | hello steve!<br>hello ashely! | Test calling function with tag. |

What is claimed is:

1. A method for compiling source code comprising operating a computer to perform steps of:
receiving source code written in a computer programming language; and
generating executable program code in only one pass of a compilation process of the source code without modifying the source code by, detecting, during the one pass of the compilation process, invalid programming constructs in the source code and generating, during the one pass of the compilation process, valid compiler constructs that represent detected invalid programming constructs, wherein invalid programming constructs are programming constructs in the source code that violate one or more grammar rules of the computer programming language; wherein the executable program code is generated without modifying errors in the source code.

2. A non-transitory computer readable storage medium having stored thereon computer executable program code which, when executed by a computer processor, will cause the computer processor to perform steps of claim 1.

3. The method of claim 1 wherein detecting invalid programming constructs include lexical analysis, syntax analysis, and semantic analysis.

4. The method of claim 1 wherein compiler constructs include token lists.

5. The method of claim 1 wherein detecting invalid programming constructs include lexical analysis of the source code, wherein invalid programming constructs include character strings in the source code that are not defined by the one or more grammar rules of the programming language, wherein generating valid compiler constructs that represent detected invalid programming constructs includes outputting an error token representative of character strings in the source code that are not defined by the one or more grammar rules of the programming language.

6. A method for compiling source code comprising operating a computer to perform steps of:
receiving source code written in a programming language;
performing lexical analysis to produce a token list comprising a plurality of first tokens and a plurality of second tokens, the first tokens corresponding to strings of the source code defined by the programming language, the second tokens corresponding to strings of the source code not defined by the programming language;

receiving the token list and performing syntax analysis to produce a parse tree;

receiving the parse tree and performing semantic analysis to produce semantic output; and receiving the semantic output and generating executable program code, wherein the executable program code is generated despite errors in the source code that can produce any lexical errors, syntax errors, or semantic errors.

7. The method of claim 6 wherein if syntax errors are detected during the syntax analysis, then performing syntax error handling to eliminate the syntax errors so that the parse tree is produced despite the syntax errors.

8. The method of claim 6 wherein one or more of the lexical error handling, syntax error handling, or semantic error handling includes generating error messages.

9. The method of claim 6 wherein generating executable program code includes linking with one or more object files.

10. A non-transitory computer readable storage medium having stored thereon computer executable program code which, when executed by a computer processor, will cause the computer processor to perform steps of claim 6.

11. A method for compiling source code comprising operating a computer to perform steps of:

receiving source code written in a computer programming language;

performing a lexical analysis of the source code including:

generating a plurality of valid tokens, wherein each valid token represents a character string in the source code that is defined by a grammar of the programming language;

generating a plurality of error tokens, where each error token represents a character string in the source code that is not defined by the grammar of the programming language; and providing a token list comprising the valid tokens and the error tokens;

receiving the token list and performing a syntax analysis on the valid tokens and the error tokens to generate a parse tree; and generating executable program code from the parse tree in only one pass of a compilation process of the source code without modifying the source code, wherein the executable program code is generated despite errors detected during the lexical analysis.

12. The method of claim 11 wherein the lexical analysis further includes:

receiving an input character from the source code to generate a character string;

if the character string is defined by the grammar, then associating the character string with a valid token; and if the character string is not defined by the grammar, then associating the character string with an error token.

13. The method of claim 12 wherein character strings in the source that are defined by the grammar are represented by valid tokens.

14. The method of claim 12 wherein character strings in the source code that are not defined by the grammar are represented by an error token.

15. A non-transitory computer readable storage medium having stored thereon computer executable program code which, when executed by a computer processor, will cause the computer processor to perform steps of claim 11.

16. A method for compiling source code comprising operating a computer to perform steps of:

receiving source code written in a computer programming language that is defined by a grammar, wherein the grammar is partitioned into a plurality of sub-grammars;

performing a lexical analysis of the source code to produce a token list;

providing the token list as an input token list to a first sub-parser among a plurality of N sub-parsers, each sub-parser being associated with one of the sub-grammars;

for each sub-parser, performing steps of:

receiving an input token list;

parsing the input token list in accordance with the associated sub-grammar;

generating an output token list based on the parsing; and providing the output token list as an input token list to a subsequent sub-parser, wherein an $N^{th}$ sub-parser receives the output token list from an $(N-1)^{th}$ sub-parser, and only the $N^{th}$ sub-parser generates a parse tree using the output token list from the $(N-1)^{th}$ sub-parser; and receiving the parse tree and generating executable program code from the parse tree.

17. The method of claim 16 wherein each sub-parser further performs steps of:

detecting errors in the input token list which do not conform to the associated sub-grammar; and performing error handling to eliminate the errors, wherein the output token list that is generated conforms to the associated sub-grammar.

18. The method of claim 16 wherein a size of an input token list that is input to a sub-parser is greater than or equal to a sized of an output token that is generated by the sub-parser.

19. A non-transitory computer readable storage medium having stored thereon computer executable program code which, when executed by a computer processor, will cause the computer processor to perform steps of claim 16.

20. The method of claim 6 wherein if semantic errors are detected during the semantic analysis, then performing semantic error handling to eliminate the semantic errors so that the semantic output is produced despite the semantic errors.

* * * * *